(No Model.) 2 Sheets—Sheet 1.

E. E. WHIPPLE.
HARROW.

No. 464,346. Patented Dec. 1, 1891.

WITNESSES:
C. C. Burdine
H. E. Peak

INVENTOR
E. E. Whipple
BY O. E. Duff
ATTORNEY.

(No Model.) 2 Sheets—Sheet 2.
E. E. WHIPPLE.
HARROW.
No. 464,346. Patented Dec. 1, 1891.
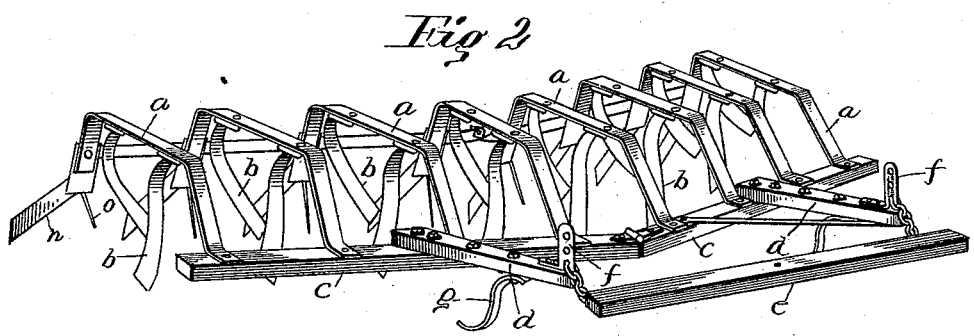
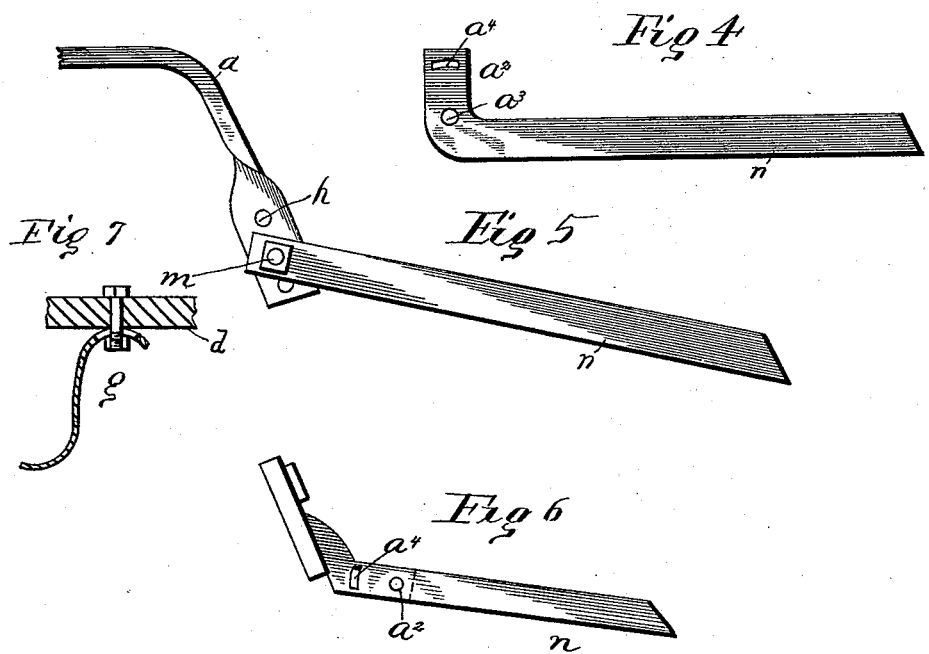
WITNESSES:
C. C. Burding.
H. E. Peck.
INVENTOR,
E. E. Whipple
BY O. E. Duff
ATTORNEY.

UNITED STATES PATENT OFFICE.

EFFINGER E. WHIPPLE, OF ST. JOHN'S, MICHIGAN.

HARROW.

SPECIFICATION forming part of Letters Patent No. 464,346, dated December 1, 1891.

Application filed January 7, 1891. Serial No. 376,955. (No model.)

*To all whom it may concern:*

Be it known that I, EFFINGER E. WHIPPLE, of St. Johns, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows.

The object of the invention is to provide an improved harrow simple, cheap, and durable in construction and exceedingly effective in operation, the particular object in view being to improve the construction of the harrow set forth in my patent, No. 392,654, dated November 13, 1888. These objects are accomplished by and my invention consists in certain novel features of construction and in combinations of parts more fully described hereinafter, and particularly pointed out in the claims.

Figure 1:
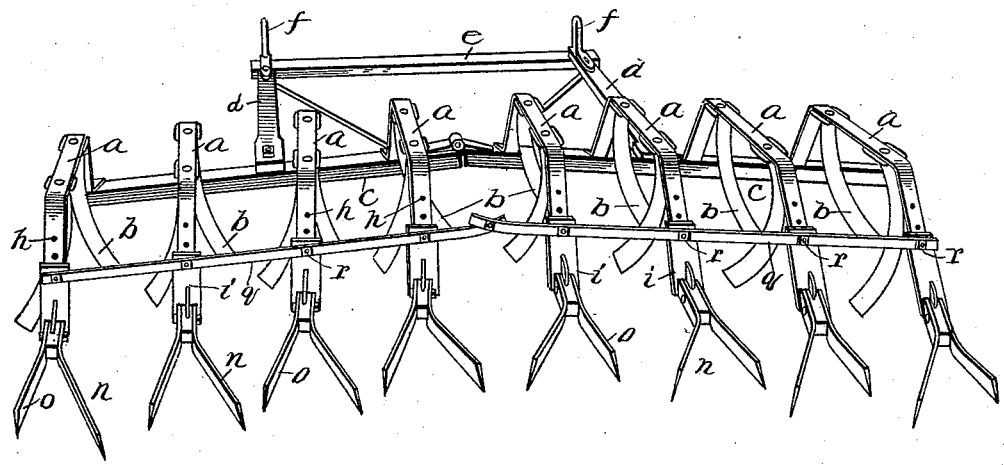
Figure 3:
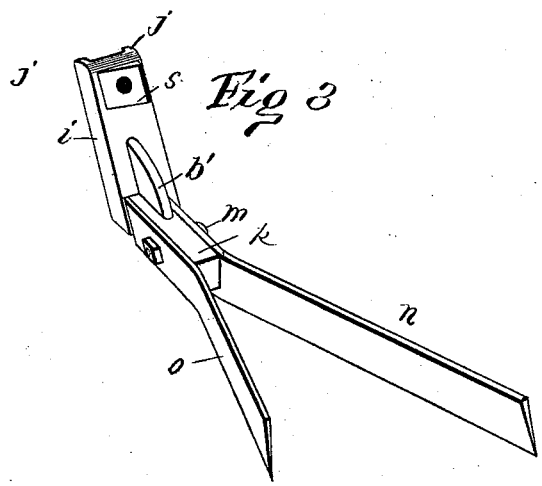

Referring to the accompanying drawings, Figure 1 is a perspective looking at the rear of the harrow. Fig. 2 is a perspective from the front. Fig. 3 is a detail view illustrating the manner of mounting the knives and securing them to the tooth-beams. Figs. 4, 5, and 6 are detail views of various modes of adjustably securing the knives to the ends of the beams. Fig. 7 is a detail view showing manner of adjusting front shoes.

My patent above mentioned describes and shows a harrow having the arched spring-tooth beams carrying front and rear leveling-bars.

In the drawings the reference-letter $a$ indicates the metal tooth-beams, preferably arched by having their front and rear ends bent down. The spring or other suitable teeth $b$ at their upper ends is coupled to the central upper portions of these tooth-beams, each tooth-beam preferably carrying two spring-teeth, which are twisted in opposite directions to cover a large surface of ground and to hold the harrow steady while in operation. The front ends of the tooth-beams are bent down, with their front extremities bent horizontal and bolted or otherwise secured to a horizontal transverse front beam $c$, coupling the tooth-beams together.

This harrow is preferably formed of two longitudinal sections hinged together at the center, with the sections inclined outwardly and rearwardly, so that the entire harrow is V shape. Hence this front coupling-beam $c$ is formed in two sections hinged together at the center, so that the two sections of the harrow are allowed independent vertical swing or can be folded together, if desirable. Horizontal beams $d$ are rigidly secured to the sections of coupling-beam $c$, and these two beams $d$ extend forwardly and parallel with each other and at their front ends carry the clevises $f$, to which the doubletree or whiffletree $e$ is loosely secured, to which the draft is attached. These clevises $f$ preferably have a vertical series of openings, so that the draft can be adjusted to various heights. The beams $d$ carry the adjustable shoes $g$, which uphold the front end of the harrow. These shoes can be vertically adjusted for various purposes. The rear end of each tooth-beam is bent down and inclined slightly rearwardly, as shown, and this downwardly-bent portion is provided with a series of bolt-holes $h$. A metal block $i$ is bolted to the rearwardly-extending end of each tooth-beam, being provided near its upper end with a bolt-hole for this purpose. The block preferably fits longitudinally on the outer side of the tooth-beam, and is provided with inwardly-extending longitudinal flanges $j$ to fit the side edges of the beam and thus hold the block against lateral swing. This block is provided with a rearwardly and downwardly inclined lug or arm $k$, cast or otherwise formed integral with the block and preferably strengthened by the rib $b$. This arm or lug is provided with one or more bolt-holes $m$. Two knife-blades $n$ $o$ at their upper ends are secured, respectively, on opposite sides of said arm or lug of the coupling-block, preferably by a single bolt passed through both knives and said lug or arm. These knives extend downwardly and rearwardly, and are sharpened at their lower longitudinal edges, and are bent and flare or extend laterally in opposite directions. The upper ends of the knives are beveled to fit the upper side of the coupling-block, and one of the knives o is shorter than the other knife n. The knives on the various tooth-beams are arranged so that a short knife-blade will cut and throw the earth toward the long knife-blade, as fully shown by the drawings. The object of having one knife longer than the other is to allow the trash, &c., to pass between the knives, for if the blades were all of the same length the outer ends of knives of adjacent pairs would approach close to each other and not allow sufficient room for the passage of the trash, &c.; but as now constructed and arranged the trash, &c., can pass the ends of the short knives and slide freely along the outer sides of the long knives, as is clearly evident. The rear ends of the tooth-beams of each section are secured together by the horizontal cross-bars $q$, bolted to each tooth-beam by the bolts $r$, which secure the knife coupling-blocks to the tooth-beam. The two metal bars $q$ are hinged together at their inner ends to allow the sections to move, as before described. These bars $q$ extend across the outer faces of the knife coupling-blocks, and each block is preferably provided with an inclined seat $s$ around its bolt-hole, against which the bar $q$ fits and is tightly bolted. The rear end of the harrow is supported by the knives, each pair acting as a shoe, and all of the knives carried by their coupling-blocks are secured together by the bars $q$ and can be vertically adjusted on the tooth-beams, and hence the operating depth of the harrow can be varied. These knives act as levelers, while also gaging the operating depth of the harrow and steadying the same—that is, these knives act as knives for cutting, pulverizing, and leveling the soil and as shoes for the rear end of the machine and govern the operating depth. By lowering the shoes at the front end of the harrow and attaching the draft at the lower point the whole weight will be thrown on the knives at the rear and the teeth of the harrow will skim the top of the sod or earth, which will be pressed down and leveled by the knives. This is very important in working loose sod or ground which is very uneven or broken, as the blades will pulverize and level the same without turning it over.

Fig. 5 shows a construction wherein the lower rear end of the beam is twisted at right angles and provided with the vertical series of apertures, and a small casting with double flanges can be used embracing said bent end and carrying the knives. The construction shown in Fig. 6 dispenses with a casting by providing the knife with upwardly-extended end $a^2$, and with pivot-hole $a^3$ at the elbow, through which and the twisted end of the tooth-beam $a$ pivot-bolt is passed, and the upper portion of the bent end of the knife is provided with a transverse segmental slot $a^4$, through which and the tooth-beam $a$ clamping-bolt is passed, whereby the knife can be clamped at various adjustments. This same idea can be applied to the blocks $i$ and the knives shown in first views by employing two bolts and having a transverse segmental slot in either the casting or knife, as shown in $f$, Fig. 7.

The many and great advantages of this machine are obvious.

It is evident that various changes might be made in the form, arrangements, and constructions of the parts described without departing from the spirit and scope of my invention. Hence I do not wish to limit myself to the construction and arrangement here shown; but

What I claim is—

1. In a harrow, the combination of tooth-beams, harrow-teeth carried thereby, and the rear knives arranged in pairs, the teeth of each pair being of different lengths and inclined laterally and oppositely, so that the short knife of one pair projects toward the long knife of adjacent pair, substantially as described.

2. The combination of the tooth-beams and teeth with the blocks secured to and vertically adjustable on the rear ends of said beams, and a pair of knives carried by each block, substantially as described.

3. In combination, the arched tooth-beams secured together at their front ends, teeth carried thereby, coupling-blocks secured on the rear ends of said beams carrying the knives, and a connecting rod or bar secured to said blocks and securing the rear ends of the beams together, substantially as described.

4. In a harrow, in combination, the tooth-beams and teeth thereof, the rear downwardly and rearwardly inclined leveling and gaging knives, the front adjustable shoes, and the vertically-adjustable draft attachments, substantially as described.

5. In a harrow, the tooth-beams parallel with the direction of movement, and teeth carried thereby, coupling-beams connecting front ends of said beams, the forwardly-extending beams from said coupling-beams and provided with the draft-clevises having the vertical series of slots or openings, and the adjustable shoes carried by said forwardly-extending beams.

6. In a harrow, a tooth-beam carrying teeth, in combination with a block secured to the rear end thereby, provided with a rear arm or lug, and knives secured thereto, said block being formed to prevent lateral twist or movement.

7. In a harrow formed in two sections, the combination of the tooth-beams extending in the direction of movement, the spring harrow-teeth carried by such beams, the two transverse bars to which the front ends of said beams are secured, said two bars hinged together at their inner ends, the transverse bars secured to the rear portions of the tooth-beams a distance from their ends and hinged together, and the leveling and gaging knives secured to and extending rearwardly from the rear ends of such tooth-beams, as and for the purposes set forth.

8. In a harrow, the combination of tooth-beams, spring harrow-teeth secured thereto, shoes for adjusting and gaging the front end of the harrow, and the rear leveling and gaging knives secured to and extending rearwardly from the harrow and to gage and act as shoes for the rear portions thereof, substantially as described.

9. In a harrow, the combination of tooth-beams, spring harrow-teeth, gaging means, substantially as described, at the front portion of the harrow, and the downwardly and rearwardly inclined leveling and gaging knives secured at the rear end of the harrow so that they can be vertically adjusted.

10. In a harrow, the arched tooth-beams extending in the direction of movement and secured together, the spring harrow-teeth secured thereto, and the series of leveling and gaging knives secured to and extending down from the rear ends of said beams, substantially as set forth.

11. In a harrow, the combination of the tooth-beams, the curved spring harrow-teeth secured to and extending down from such beams, and the rear leveling and gaging knives extending downwardly and rearwardly from such beams and each provided with the lower front cutting-edge, said knives secured to gage the working depth of the teeth, as set forth.

In testimony that I claim the foregoing as my own I affix my signature in presence of two witnesses.

EFFINGER E. WHIPPLE.

Witnesses:
GEO. FERGUSON,
M. D. HUBBARD.